United States Patent [19]

Dujari

[11] Patent Number: 5,007,012

[45] Date of Patent: Apr. 9, 1991

[54] FLY-BY DATA TRANSFER SYSTEM

[75] Inventor: Vineet Dujari, Santa Clara, Calif.

[73] Assignee: Advanced Micro Devices, Inc., Sunnyvale, Calif.

[21] Appl. No.: 242,744

[22] Filed: Sep. 9, 1988

[51] Int. Cl.⁵ .............................................. G06F 13/00
[52] U.S. Cl. .............................. 364/900; 364/939.3; 364/939.4; 364/940.4; 364/951
[58] Field of Search ................................ 364/200, 900

[56] References Cited

U.S. PATENT DOCUMENTS

| | | | |
|---|---|---|---|
| 4,334,287 | 6/1982 | Wiedenman et al. | 364/900 |
| 4,404,650 | 9/1983 | Kleinert | 364/900 |
| 4,442,485 | 4/1984 | Ota et al. | 364/200 |
| 4,538,224 | 8/1985 | Peterson | 364/200 |
| 4,591,973 | 5/1986 | Ferris, III et al. | 364/200 |

Primary Examiner—Thomas M. Heckler
Attorney, Agent, or Firm—Lowe, Price, LeBlanc, Becker & Shur

[57] ABSTRACT

A method of transferring data in one access cycle between two devices over a communications bus. Data is read from a predetermined location in the first device. The data is also latched into a temporary register. Data is simultaneously written into a predetermined location of a second device. The read operation of the first device is terminated and the data from the temporary register is applied to the second device simultaneously with the termination step so that data is available to the second device notwithstanding the fact that the first device has ceased transmission.

28 Claims, 5 Drawing Sheets

FLY-BY DATA TRANSFER SYSTEM

BACKGROUND OF THE INVENTION

The present invention relates to a mechanism for transferring data between two devices in a data processing system and, more particularly, to a system for facilitating fly-by direct memory access (DMA) data transfer.

Historically, in digital data processing systems, great amounts of data had to be transferred between peripheral devices and memory. In these systems the central processing unit was responsible for transferring data between memory and peripheral devices under program control. Such data transfer systems were slow because for each byte of data transferred, the central processing unit had to fetch and execute the many instructions required to accomplish a transfer. Also, the central processing unit could not tend to other tasks while it wa involved with transferring data.

Eventually, a direct memory access facility replaced the slower program controlled data transfer between a device and memory. In data processing systems in which two devices transfer data between one another over a communications bus, the use of direct memory access devices is now well known. The direct memory access facility allows data to flow directly from memory to a particular device unattended. This data transfer mechanism is called flow-thru.: In other words, central processing unit control is no longer required after the initial data location is identified and the quantity of data is determined. When a device is to access data in memory, the DMA unit, disposed between the device and memory, controls the data transfer therebetween.

The DMA unit typically has a temporary storage register for buffering data from memory that is transferred to the device in order to have such data available for the device when needed. Thus, in typical DMA read operations, data at a particular address in memory is transferred (read) from the memory to the temporary storage register of the DMA unit and thence from the temporary storage register to the requesting device. Likewise, in typical DMA write operations, data is generated by a device, transferred to the DMA temporary register, and then retransmitted to the appropriate location in memory for storage therein.

More recently, a so-called fly-by technique has been developed by which a temporary storage register in the DMA unit is no longer required. In fly-by DMA read data transfers, data is read from memory and transmitted to the requesting device under control of the DMA unit but is not stored in a temporary storage register thereof. The fly-by transfer mode requires that there be separate read and write controls for both source and destination. Fly-by DMA write operations work in a similar fashion.

Dynamic Random Access Memory (DRAM) devices are frequently used in systems because of their low cost and high density. In order to access a location in memory, the address of the location must be supplied to the device along with appropriate control signals.

In order to optimize the internal layout of the memory and minimize pin count of the device, it is desirable to supply the address of the desired memory location in two parts called row and column addresses, using the same set of pins. Row Address Strobe (RAS) and Column Address Strobe (CAS) clock signals indicate the presence of row and column addresses on the pin and are used by the internal logic of DRAM devices to latch the address internally. An additional control signal called Write Enable (WE) is used to indicate whether the desired memory access cycle is a read cycle (WE inactive) or a write cycle (WE active).

By organizing the memory in an array of rows and columns, successive memory locations fall in the same row until all elements of that row have been accessed. Also, whenever any bit in a row is accessed, internally the whole row is accessed and brought outside the memory array. Then the selected column bit, as identified by the column address strobe, is supplied to the requesting device. If the row address of the next access is the same as that of the previous access, the next location can be selected simply by applying the column address of that location and activating the CAS control line. This technique is known as running a CAS cycle.

Unfortunately, a minimum off-time exists between two consecutive CAS cycles. Moreover, data setup and hold time requirements for the requesting device necessitate a predetermined length of time between memory accesses if the conventional fly-by technique is used. More importantly, they cannot be designed to work with the same minimum cycle time. This is due to the fact that the transmitting device has incompatible data output and data turnoff delay and the receiving device has incompatible data setup and data hold times.

It would be advantageous to provide a system of data transfer in a DMA environment using an improved fly-by technique.

It would also be advantageous to provide a system to start a read operation of data in a DRAM and to capture this data quickly.

It would also be advantageous to provide a system for transferring data in which the data captured from a data communications bus could be redriven onto the bus within one cycle.

It would also be advantageous to deactivate the CAS line while data is being redriven on the data bus, thereby allowing the CAS line to be reactivated in a shorter than usual period of time.

SUMMARY OF THE INVENTION

In accordance with the present invention, there is provided a method of transferring data in one access cycle between two devices over a communications bus. Data is read from a predetermined location in the first device. The data is also latched into a temporary register. Data is simultaneously written into a predetermined location of a second device. The read operation of the first device is terminated and the data from the temporary register is applied to the second device simultaneously with the termination step so that data is available to the second device notwithstanding the fact that the first device has ceased transmission.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
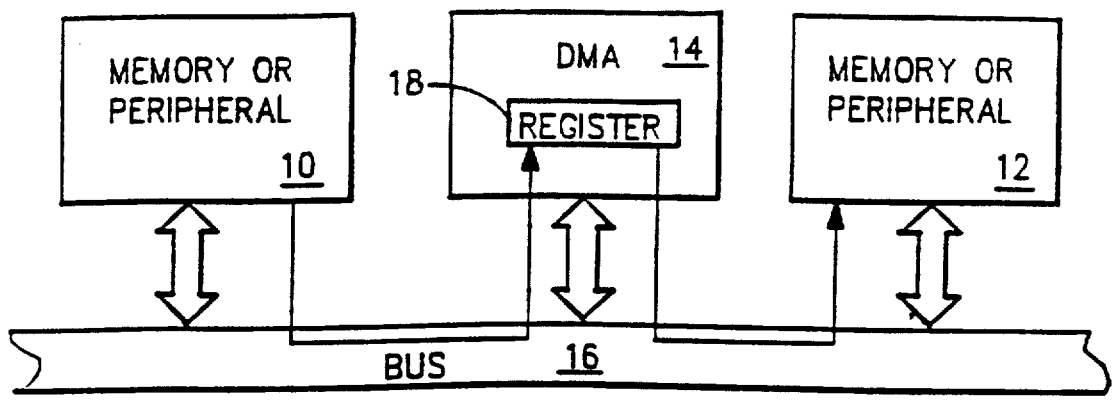
FIG. 1 is a block diagram of a data transfer configuration of the prior art used for DMA flow-thru operations.

Two types of data transfer transactions can be performed in conventional DMA environments: flow-thru and fly-by. Referring now to FIG. 1 there is shown a block diagram of a data transfer configuration used for flow-thru as is known in the prior art. A flow-thru transaction consists of a separate read and a separate write cycle.

Conventionally, in a DMA system a peripheral device accesses data directly from memory. However, in the more general case, two peripheral devices can be connected by means of a communications bus to one DMA unit. As shown in FIG. 1, one memory unit or a peripheral device is shown at reference numeral 10 and another one is shown at reference numeral 12. A DMA unit 14 is connected to each of the devices or memory units 10 and 12 and to a system communications bus 16 to which both devices 10 and 12 are also connected. For simplicity of description, component 10 is hereinafter considered a memory unit and component 12 is considered a peripheral device.

The communications bus 16 actually includes a data bus and an address bus, but for an I/O device, the address bus is not necessary for the device to receive data.

DMA unit 14 includes a temporary register 18. During a memory to peripheral transfer, data from memory 10 is loaded into temporary register 18 over system bus 16. The data is then sent to peripheral device 12 over system bus 16.

During a peripheral to memory transfer, data from peripheral device 12 is loaded into temporary register 18 over system bus 16. The data is then sent to memory 10 over system bus 16.

A memory to peripheral transfer is performed as follows. DMA unit 14 starts a memory read cycle by driving the address of the desired memory location on system address bus 16. Appropriate control signals are activated by DMA unit 14 to indicate that a memory read cycle is in progress. Memory 10 responds to this read request by placing the data from the addressed memory location on system data bus 16. DMA unit 14 latches this data into temporary register 18 and deactivates the control signals to terminate the memory read cycle.

DMA unit 14 now starts a peripheral device write cycle by gating the data from temporary register 18 onto system data bus 16. Appropriate control signals are then activated by DMA unit 14 to indicate that a peripheral write cycle is in progress. Peripheral device 12 accepts the data from system data bus 16. The cycle is then terminated by DMA unit 14 by deactivating the control signals.

It should be noted that the cycle time of memory and peripheral device can be controlled independently by external hardware, internal software-controlled hardware, or a combination of both. The total transfer time is the sum of two transfer cycles required to perform one transfer.

Moreover, since at any give instant either a read cycle or a write cycle is in progress, one common set of read/write control signals can be used.

Peripheral to memory, or memory to memory data transfers are performed in a similar fashion.

Figure 2:
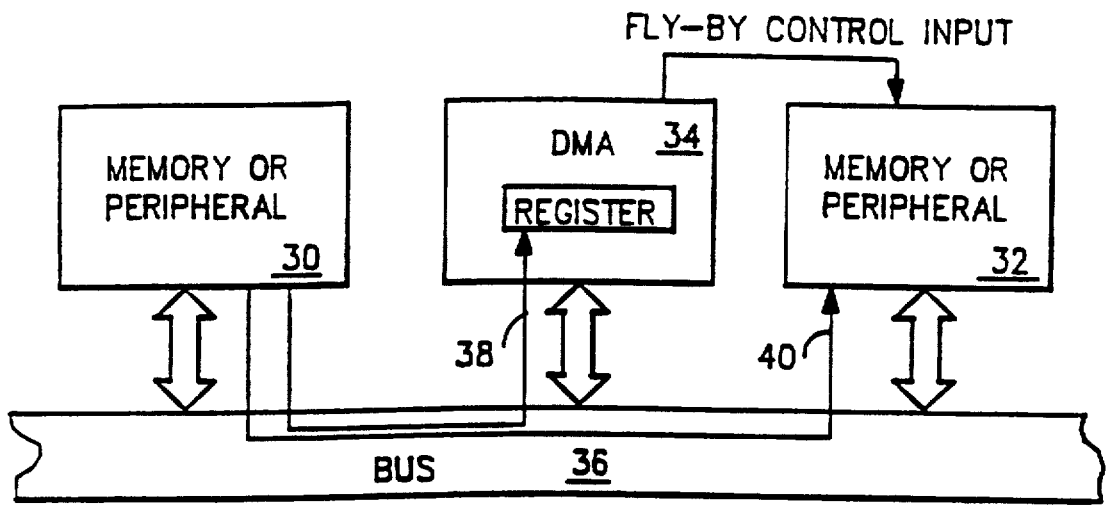
FIG. 2 is a block diagram of a data transfer configuration of the prior art used for DMA fly-by operations.

Referring now also to FIG. 2, there is shown a block diagram of a data transfer configuration used for fly-by as is known in the prior art. Memory 30 and fly-by peripheral device 32 are connected to DMA unit 34. A system bus 36 is connected to all three of the aforementioned devices. Data is addressed in memory 30 by DMA 34 over memory address line 38. Data is transferred from memory 30 to peripheral device 32 over data line 40. A fly-by control signal is transmitted from DMA unit 34 to peripheral device 32 when DMA unit 34 has successfully transmitted data from memory 30 to device 32. No temporary register is needed in DMA unit 34 for data transfer operations between memory 30 and peripheral device 32.

Fly-by data transfer operations are performed in a single cycle, providing a transfer rate significantly faster than that available by flow-thru operations. In fly-by, data can be transferred between memory and peripheral device or between peripheral device and peripheral device. Memory-to-memory operations cannot normally be performed in fly-by mode, but only in flow-thru mode.

Fly-by mode permits faster data transfer than does flow-thru mode. Data can be transferred in one cycle in fly-by mode as opposed to two cycles required by the flow-thru transfer.

As explained hereinbelow, during fly-by transfer one device (e.g., memory) is read while another device (e.g., peripheral) is written. This precludes the use of a common read/write control signal, since only a read command or a write command can be conveyed at one time over one set of control signals. To overcome this problem, systems that permit fly-by transfer either design in external logic or work with peripherals that have a special fly-by control signal input.

In a memory to peripheral fly-by transfer, DMA unit 34 starts a memory read cycle by driving the address of the desired memory location on system address bus 36. Appropriate control signals are generated by DMA unit 34 to indicate that a memory read cycle is in progress. Memory 30 responds to this read request by placing the data from the addressed memory location on system data bus 36.

DMA unit 34 also activates control signal of peripheral device 32 to indicate a fly-by operation. Peripheral device 32 accepts the data from system data bus 36 driven by memory 30. The transfer cycle is then terminated by DMA unit 34 by deactivating the control signal.

As mentioned hereinabove, the cycle time of memory and peripheral device can be controlled by external hardware, internal software-controlled hardware, or a combination of both. However, the cycle time of each component must be adjusted to at least equal the slower of the two cycle times. The total transfer time is typically greater than the longer of two cycle times in order to satisfy other associated timing requirements.

Memory to peripheral transfers are performed in a similar fashion.

Figure 3:
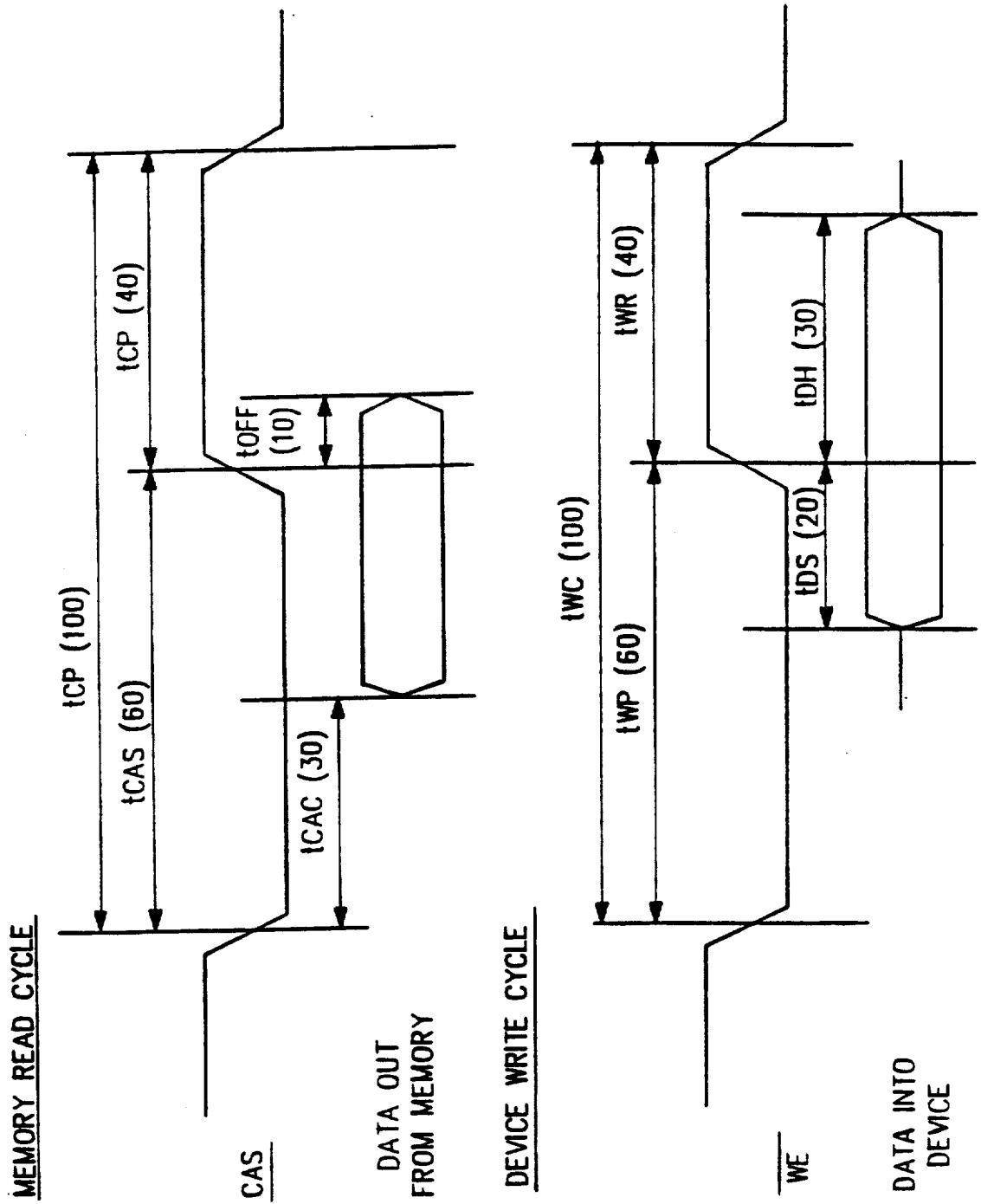
FIG. 3 is a timing diagram of memory and peripheral device cycle time.

FIG. 3 is a timing diagram that represents typical memory and peripheral device cycle time. In the FIGURE, numbers in parentheses represent time in nanoseconds. Timing parameters are abbreviated as follows:

MEMORY READ CYCLE TIMING PARAMETERS tPC Page Mode Cycle Time
tCAS CAS Pulse Width
tCP CAS Precharge Time
tCAC Access Time from CAS
tOFF Output Buffer Turn-off Delay

DEVICE WRITE TIMING PARAMETERS tWC Write Cycle Time
tWR Write Recovery Time
tDS Write Data Setup Time
tDH Write Data Hold Time As an illustrative example, consider the case where both the memory and the device have a cycle time of 100 nsecs. They cannot operate together at 100 nsecs because the device requires data to stay valid for 50 nsecs, whereas the memory guarantees that data will stay valid for only 40 nsecs. This problem is addressed by the present invention.

Figure 4:
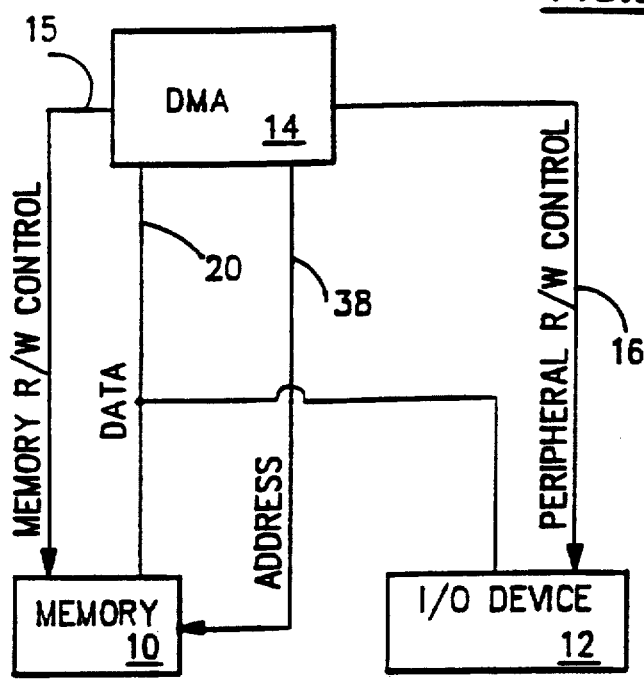
FIG. 4 is a block diagram of a data transfer configuration used in accordance with the present invention.

Referring now also to FIG. 4, there is shown a block diagram depicting the data transfer system of the present invention. Once again, memory 10, I/O peripheral device 12 and DMA unit 14 are operatively connected to one another; but in accordance with the present invention, there are two independent sets of read/write control signals. Memory read/write control lines 15 are used for transmitting control signals to DRAM devices that are used to implement memory unit 10 in the preferred implementation. Peripheral read/write control lines 16 are used for transmitting control signals to I/O peripheral device 12.

Figure 5:
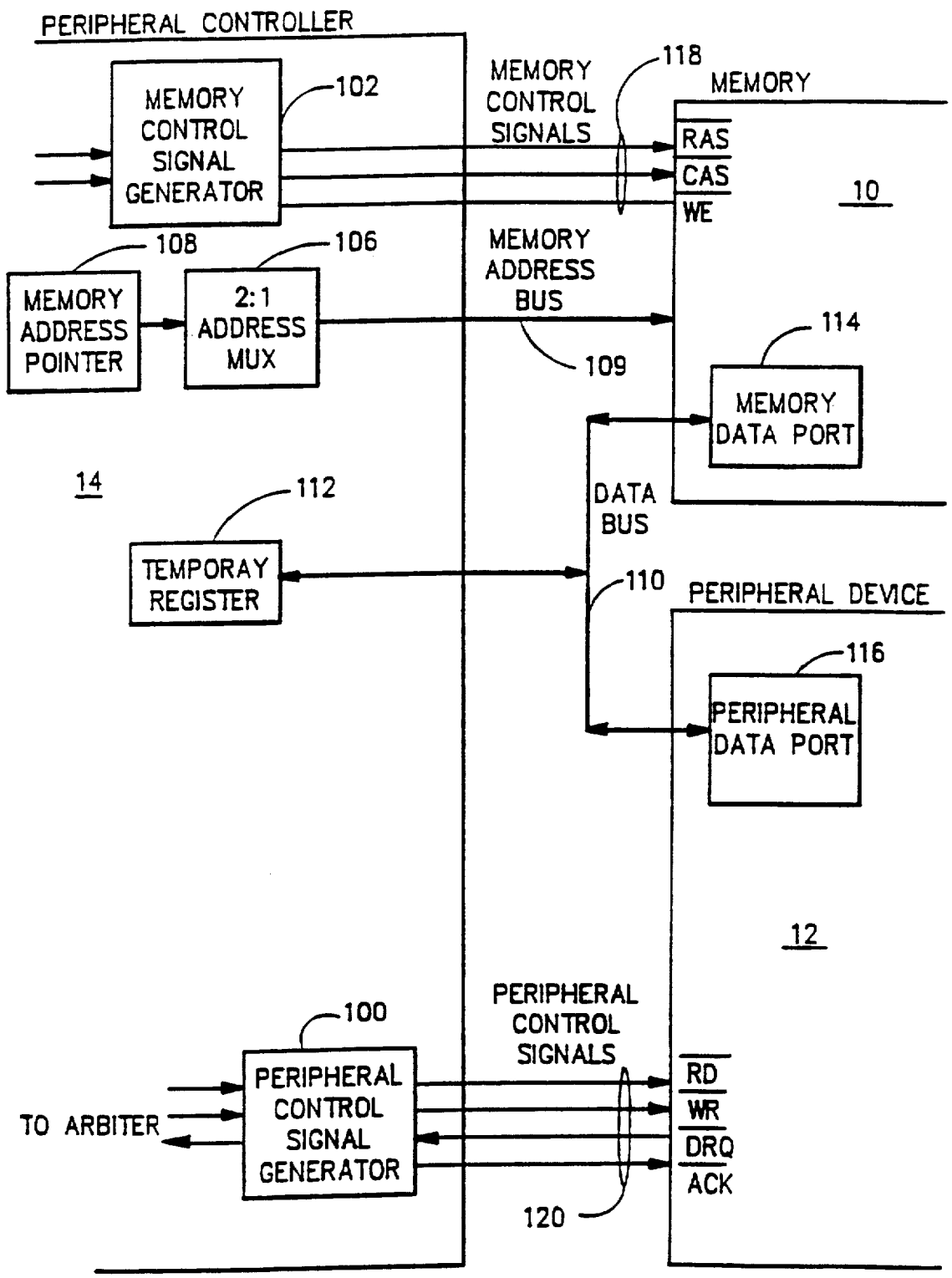
FIG. 5 is a block diagram of signal lines used in the present invention.

Referring now also to FIG. 5, there is shown a block diagram showing the inventive system in greater detail and depicting signal lines used in the present invention. The description of this FIGURE is best understood with reference also to FIGS. 6 and 7, which show timing diagrams of data transfer operations.

Memory unit 10 and peripheral device 12 are connected to one another and to peripheral controller 14 using a data bus 110. Memory unit 10 and peripheral controller 14 are also connected by means of an address bus 109 that is used to transmit the address of the memory location to be accessed.

Memory unit 10 and peripheral controller 14 are further connected by a set of memory control signals 118, that are used to perform a read or a write operation on memory unit 10. Since memory unit 10 in the preferred implementation comprises DRAM devices, control signals are Row Address Strobe (RAS), Column Address Strobe (CAS) and Write Enable (WE).

A set of peripheral control signals 120 connects peripheral controller 14 and peripheral device 12. Once again, these signals are used to perform read or write operations on peripheral device 12. Read and write operations are performed on peripheral device 12 only when device 12 indicates that it is ready for such an operation using a Data Request (DRQ) signal. Peripheral controller 14 indicates that the requested operation is being performed using a Data Acknowledge (ACK) signal, while the type of operation (read or write) is also indicated using a RD or WR signal.

Peripheral controller 14 contains a memory control signal generator 102, an address pointer 108 (used to identify a location in memory unit 10) and a 2-to-1 multiplexer 106 used to multiplex the memory address into Row Address and Column Address portions, as required by DRAM devices. Also present is a temporary register 112 that holds data being transferred. A peripheral control signal generator 100 is used to generate control signals for peripheral device 12.

A memory data port 114 is disposed in memory unit 10. Similarly, a peripheral data port 116 is located in peripheral device 12.

Figure 6:
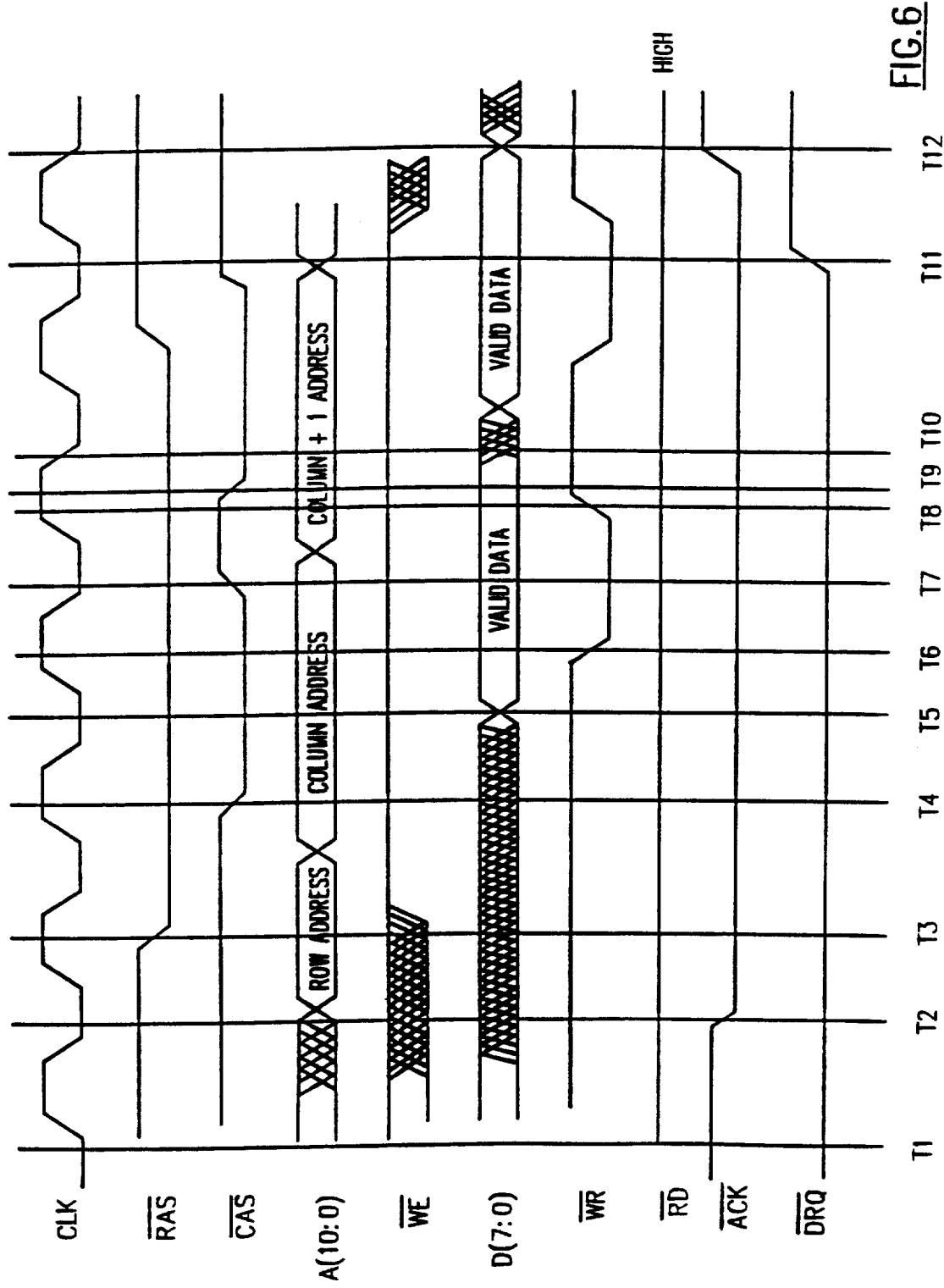
FIGS. 6 and 7 are timing diagrams showing data transfer operation.
Figure 7:
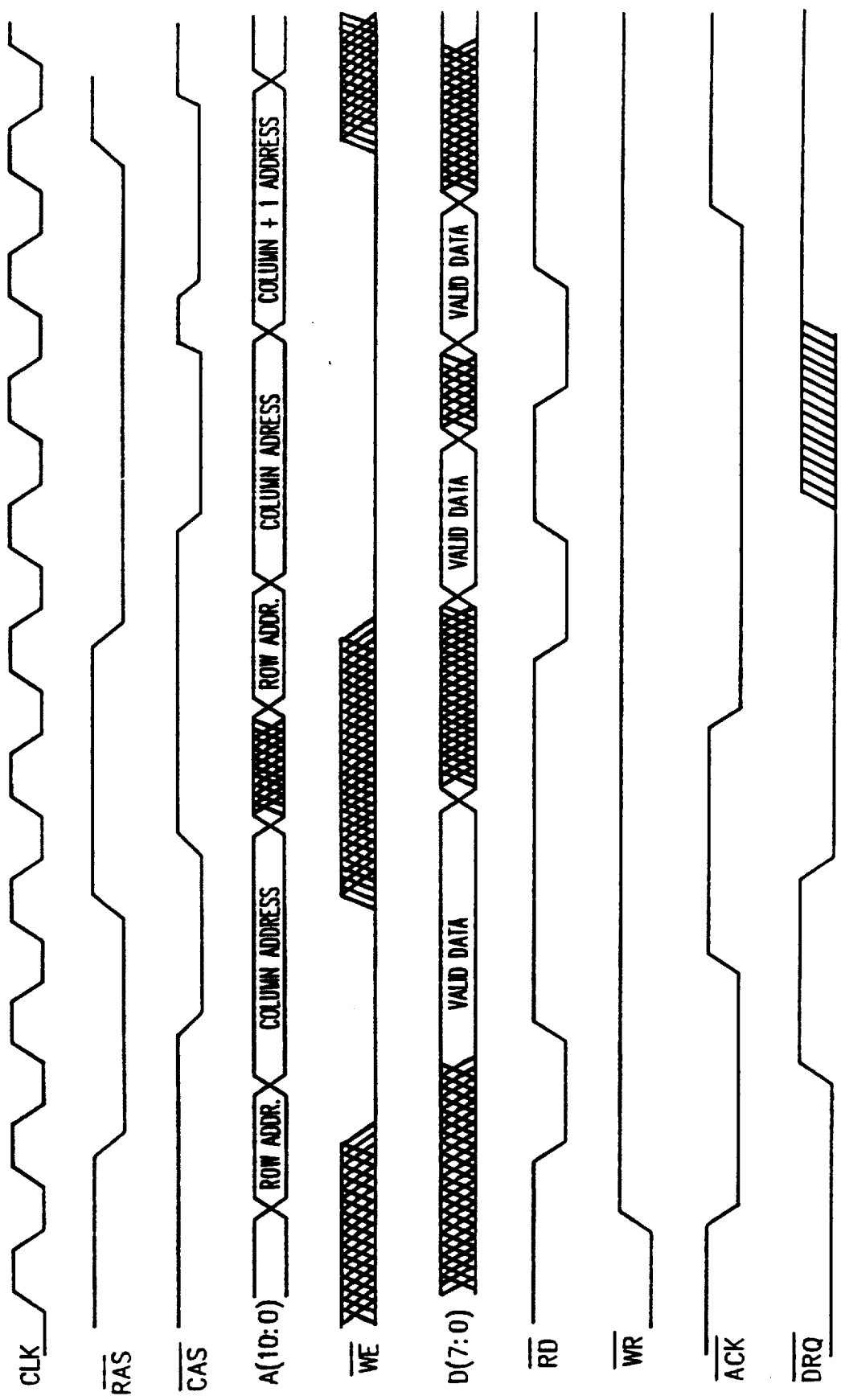

FIG. 6 shows the timing of signals used to control the flow of data from memory unit 10 to peripheral device 12 as used in this invention, while FIG. 7 shows the timing of signals used to control the flow of data from peripheral device 12 to memory unit 10.

For purposes of describing memory 10 to peripheral device 12 data transfer, it is presumed that peripheral device 12 has been preprogrammed to transfer a block of data from memory 10 to a device (not shown) connected to it. It is also presumed that the starting address of this block of data has been preprogrammed in address pointer 108.

Typically peripheral device 12 has the capability to accept a multiple number of data bytes in a burst. Similarly, memory 10 is capable of providing a multiple number of data bytes in a burst. A burst can be terminated for the following reasons:

(1) the required number of bytes has been transferred;

(2) peripheral device 12 indicates that it can no longer accept data by negating the DRQ signal;

(3) a page boundary is crossed in the memory address (i.e., the row address of the next location to be accessed in memory 10 will be different from the row address of the current location); or (4) a predetermined burst length has been exhausted.

In systems that support preemptible memory transfers, transfer must be performed on the bus.

Whenever peripheral device 12 is prepared to accept data, it signals this condition by activating DRQ at time T1, as shown in FIG. 6.

Peripheral controller 14 senses this DRQ signal and responds by activating an ACK signal at time T2. A memory read operation is initiated by controller 14 by driving the row address portion of the memory location to be accessed on the memory address bus.

RAS signal is activated at time T3 to indicate to memory 10 that it should latch the row address internally. Mux control signal 104 is now activated to drive the column address portion of the memory location on to the memory address bus 109. WE signal is also negated to indicate that a memory read cycle is to be performed. CAS is then activated at time T4 to indicate to memory 10 that the column address and WE signals are valid. Memory 10 responds by outputting data from the addressed memory location at time T5.

The peripheral device write control signal is activated at time T6. Also, the data from memory 10 is stored in temporary register 112. Address pointer 108 is now incremented to point to the next memory location to be accessed. Sometime between time T6 and T7, data from temporary register 112 is driven back out on data bus 110. Since the data value sent out by temporary register 112 is the same as that being sent by memory device 10, no data conflicts arise on data bus 110.

At time T7, the CAS control is deactivated in preparation of termination of the current memory cycle. Even though memory 10 can cease supplying data to peripheral device 12 immediately (zero nanoseconds) after time T7 (i.e., when minimum output buffer turn-off delay, tOFF, equals 0 nsecs) and the data setup time for peripheral device 12 has not been satisfied, CAS signal can be deactivated because the data from temporary register 112 is still being supplied to peripheral device 12. The column address of the next location to be accessed is driven out on memory address bus 109 at this time.

After meeting the setup time requirement of peripheral device 12, the peripheral write control signal is deactivated at time T8.

CAS signal is activated at time T9 to initiate the next memory read cycle. Since CAS was deactivated at time T7, earlier than would have been usual for conventional fly-by DMA systems, it can now be turned on at time T9, also earlier than would have been otherwise possible after satisfying the CAS precharge time (tCP) requirement. In conventional fly-by DMA systems, as heretofore knoWn in the art, the CAS signal would have had to be kept active to meet the setup and hold time requirements of the peripheral device.

At time T10, the data output from temporary register 112 is turned off, so memory 10 can drive the data value from the next accessed location for the next cycle.

The aforedescribed sequence of events is now repeated for the next cycle (between time T10 and T12).

This sequence of data transfer continues until one or more of the aforementioned terminating conditions occurs. In the example shown, the transfer is terminated because peripheral device 12 indicated its inability to accept any more data by deactivating the DRQ signal at time T11.

FIG. 7 shows the timing sequence for a one-byte and a two-byte transfer burst for peripheral device to memory data transfers. The basic mechanism is similar to that described above for memory to peripheral device transfers and therefore need not be described in greater detail here.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method for transferring data in one access cycle between two devices over a data communications bus, the steps comprising:
   (a) performing a read operation to read data from a predetermined location in a first device;
   (b) latching said data into a temporary register while writing said data into a predetermined location in a second device; and
   (c) terminating the read operation of said first device and providing said data from said temporary register to said second device so that said data is available to said second device after said first device no longer supplies said data to said second device.

2. The method of transferring data in accordance with claim 1 wherein said temporary register is disposed in a DMA device.

3. The method of transferring data in accordance with claim 2 wherein said data communications bus is bidirectional.

4. The method of transferring data in accordance with claim 3 wherein said data reading step (a) comprises activating a read control signal.

5. The method of transferring data in accordance with claim 4 wherein said data read terminating step (c) comprises deactivating said read control signal.

6. The method of transferring data in accordance with claim 5 wherein said data writing step (b) comprises activating a write control signal.

7. The method of transferring data in accordance with claim 1 wherein one of said devices is a memory device.

8. The method of transferring data in accordance with claim 7 wherein the other of said devices is an I/O device.

9. A method for decreasing the period of a data transfer cycle in a system having a predetermined memory recovery time and a predetermined setup time, the steps comprising:
   (a) reading data from a predetermined location in a first device having a predetermined memory recovery time;
   (b) while latching said data to a temporary register, writing said data into a predetermined location in a second device having a predetermined setup time; and
   (c) terminating the read operation of said first device prior to said second device setup time, so that recovery of said first device can begin.

10. The method for decreasing the period of a data transfer cycle in accordance with claim 9, the steps further comprising:
    (d) providing said data from said temporary register to said second device simultaneously with step (c).

11. The method for decreasing the period of a data transfer cycle in accordance with claim 10 wherein said temporary register is disposed in a DMA device.

12. The method for decreasing the period of a data transfer cycle in accordance with claim 11 wherein said data communications bus is bidirectional.

13. The method for decreasing the period of a data transfer cycle in accordance with claim 12, wherein said data reading step (a) comprises activating a read control signal.

14. The method for decreasing the period of a data transfer cycle in accordance with claim 13 wherein said data read terminating step (c) comprises deactivating said read control signal.

15. The method for decreasing the period of a data transfer cycle in accordance with claim 12 wherein said data writing step (b) comprises activating a write control signal.

16. The method for decreasing the period of a data transfer cycle in accordance with claim 10 wherein one of said devices is a memory device.

17. The method for decreasing the period of a data transfer cycle in accordance with claim 16 wherein the other of said devices is an I/O device.

18. A method for decreasing the period of a data transfer cycle in a system having a predetermined memory comprising:
    (a) reading data from a first device having a predetermined output delay;
    (b) while latching said data to a temporary register, writing said data into a predetermined location in a second device having a predetermined setup time; and
    (c) terminating the read operation of said first device prior to said second device setup time, so that recovery of said first device can begin.

19. The method for decreasing the period of a data transfer cycle in accordance with claim 18, the steps further comprising:

(d) providing said data from said temporary register to said second device simultaneously with step (c).

20. The method for decreasing the period of a data transfer cycle in accordance with claim 19 wherein said temporary register is disposed in a DMA device.

21. The method for decreasing the period of a data transfer cycle in accordance with claim 20 wherein said data communications bus is bidirectional.

22. The method for decreasing the period of a data transfer cycle in accordance with claim 21, wherein said data reading step (a) comprises activating a read control signal.

23. The method for decreasing the period of a data transfer cycle in accordance with claim 25 wherein said data read terminating step (c) comprises deactivating said read control signal.

24. The method for decreasing the period of a data transfer cycle in accordance with claim 21 wherein said data writing step (b) comprises activating a write control signal.

25. The method for decreasing the period of a data transfer cycle in accordance with claim 19 wherein one of said devices is a memory device.

26. The method for decreasing the period of a data transfer cycle in accordance with claim 25 wherein the other of said devices is an I/O device.

27. An apparatus for transferring data in one access cycle between first and second devices over a data communications bus, said apparatus comprising:
   means for performing a read operation to read data from a predetermined location in said first device;
   means for latching said data into a temporary register and writing said data into a predetermined location in said second device; and
   means for supplying said data in said temporary register to said predetermined location in said second device when said first device no longer supplies said data to said second device.

28. An apparatus for decreasing the period of a data transfer cycle in a system having a predetermined memory recovery time and a predetermined setup time, said apparatus comprising:
   means for performing a read operation to read data from a predetermined location in a first device;
   means for latching said data in a temporary register and writing said data into a predetermined location in a second device having a predetermined setup time; and
   means for terminating said read operation prior to said second device setup time while providing said data latched in said temporary register to said second device.

* * * * *